Oct. 12, 1971 R. W. GRABENKORT ET AL 3,611,511
QUICK-RELEASE FASTENING DEVICE

Filed Feb. 25, 1970

Richard W. Grabenkort
James N. Karas
INVENTORS

BY *Howard J. Murray* Agent

*Q. Baxter Warner*
Attorney

Oct. 12, 1971  R. W. GRABENKORT ET AL  3,611,511
QUICK-RELEASE FASTENING DEVICE
Filed Feb. 25, 1970  3 Sheets-Sheet 2
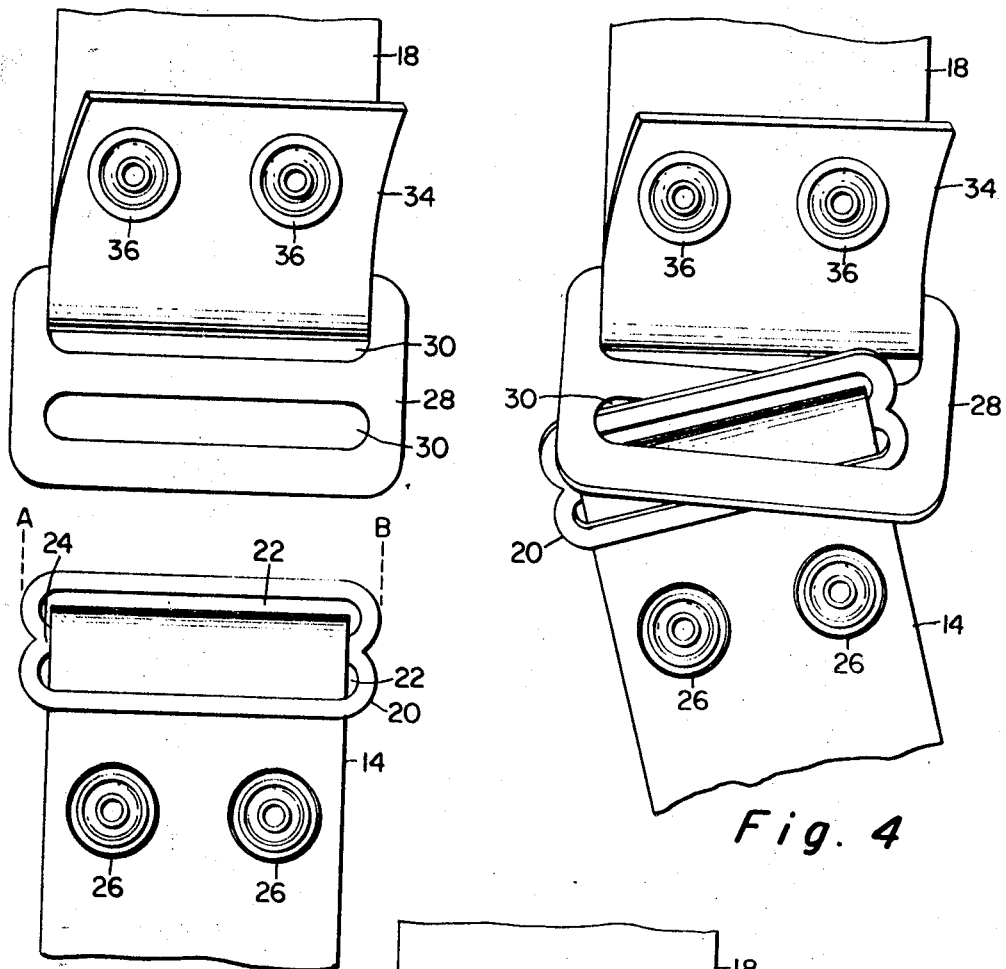
Fig. 3
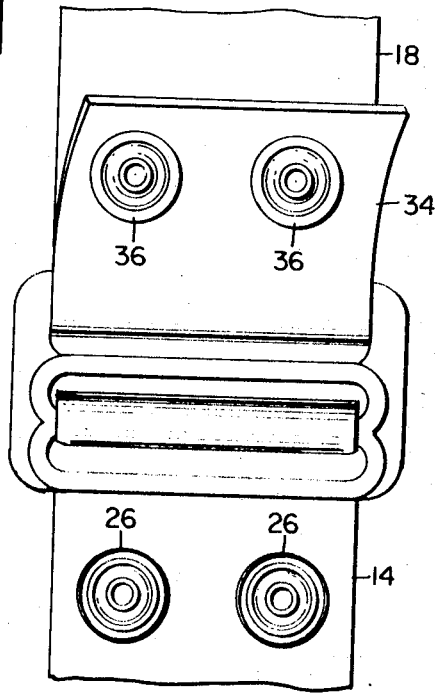
Fig. 4
Fig. 5

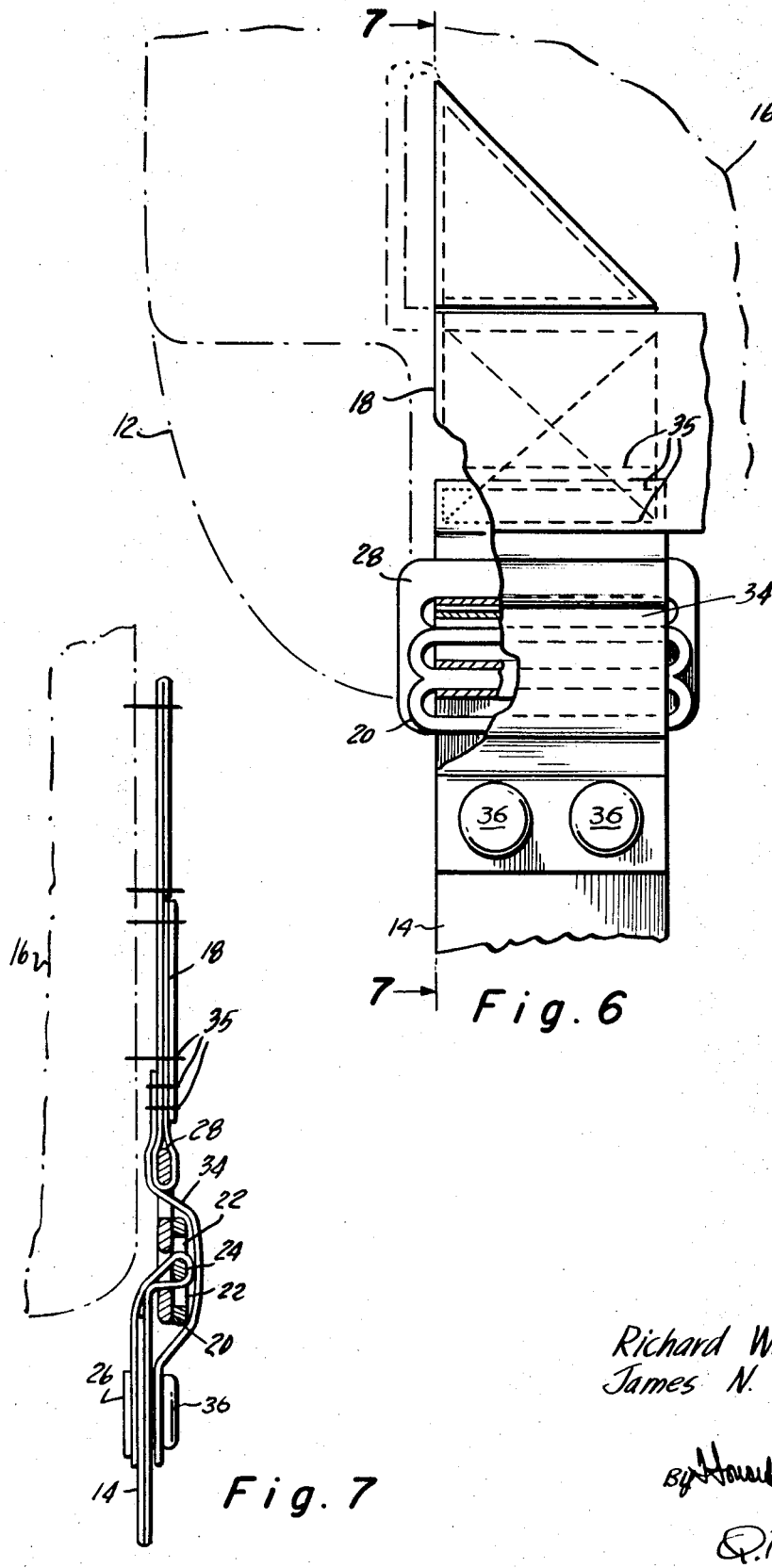

3,611,511
QUICK-RELEASE FASTENING DEVICE
Richard W. Grabenkort, Grand Prairie, and James N.
Karas, Arlington, Tex., assignors to the United States
of America as represented by the Secretary of the
Navy
Filed Feb. 25, 1970, Ser. No. 14,154
Int. Cl. A44b 17/00
U.S. Cl. 24—201    2 Claims

ABSTRACT OF THE DISCLOSURE

A pair of straps are detachably connected by a buckle, the latter being made up of two slotted plates respectively carried on the strap ends. One plate is of greater width than the slot in the other plate, so that the former can only be inserted in or removed from the latter when the two plates are positioned in angular relationship to one another. A safety flap maintains the desired parallel interlocking condition during periods of strap connection.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

It is frequently necessary to provide for the interconnection of two members by means of straps respectively attached thereto. In many cases, however, it is also desirable to provide for the subsequent temporary separation of these members for various reasons such as maintenance or repair. Consequently, the joining means should be capable of being disconnected quickly and easily without affecting its capability of subsequent re-assembly as often as may be required.

Although many different forms of fasteners are available, including clasps, buttons, snaps, etc., they do not ordinarily provide absolute assurance against unwanted separation in the event of extreme stress. On the other hand, those with a built-in safety factor usually are difficult or time-consuming to disconnect when such action is desired. In some cases, the complexity of the assembly makes it subject to the possibility of a malfunction.

One situation where no ready solution has heretofore been found is that of interconnecting the parachute and the survival kit in a military aircraft. It has been customary to sew together the respective straps attached to these members, but, since military maintenance directives presently require all parachutes and survival kits to be thoroughly inspected and repacked every 120 days, the sewing of these connection straps had to be cut and then re-sewn after each such inspection. This obviously called for an improvement in the techniques involved. The problem was made more difficult of solution by the fact that the overall length of the straps is critical in order to maintain the survival kit properly positioned with respect to the parachute, so that the connecting member can not slip or flex to any appreciable degree without jeopardizing successful functioning of the parachute in the event of an emergency pilot bail-out.

SUMMARY OF THE INVENTION

The device herein disclosed is designed for use in situations where a quick-release fastening device is required, and is particularly adapted for incorporation into the parachute-survival kit assembly of a military aircraft. It is made up of a pair of slotted plates, one of which is insertable into an opening in the other. However, since the former is wider than the opening into which it is to be inserted, the procedure can take place *only* when the two plates are angularly positioned with respect to one another. Similarly, separation can occur *only* when such an angular relationship is brought about. To insure that no such angular positioning happens unintentionally, a safety flap is provided to maintain a parallel alignment between the two joined plates *until* intentional separation thereof is desired, at which time disconnection is readily accomplished.

STATEMENT OF THE OBJECTS OF THE INVENTION

One object of the present invention, therefore, is to provide a quick-disconnect device which is simple and positive in both design and operation.

A further object of the invention is to provide a quick-disconnect device particularly suited for joining the parachute and survival kit in a military aircraft.

Another object of the invention is to provide a quick-disconnect device in the form of a buckle composed of a pair of slotted plates, one of which can be inserted into or removed from a slot in the other only when the two plates lie at an angle to one another.

Other objects, advantages and novel features of the invention will become apparent from the following detailed description of the invention when considered in conjunction with the accompanying drawings wherein:

BRIEF DESCRIPTION OF THE DRAWINGS

FIGS. 3 through 6 show the sequence of steps involved in connecting two straps, each of which carries a portion of the invention device on an end thereo; and FIG. 7 is a cross-sectional view of FIG. 6 along the line 7—7.

DESCRIPTION OF THE PREFERRED EMBODIMENTS

Although the present invention is capable of utilization in any environment where it is desired to provide for the quick and positive connection and disconnection of two straps, it is particularly suited for incorporation into a military aircraft in order to attach a survival kit to a parachute. Inasmuch as the former is frequently detached from the parachute for inspection and/or repacking with fresh supplies, some coupling device which is not only quickly and easily separable but also positive in operation is necessary. Consequently, the invention will be described hereinafter as integrated into such an arrangement, but it will be understood that such description is only exemplary in nature and is not presented in a restrictive sense.

Figure 1:
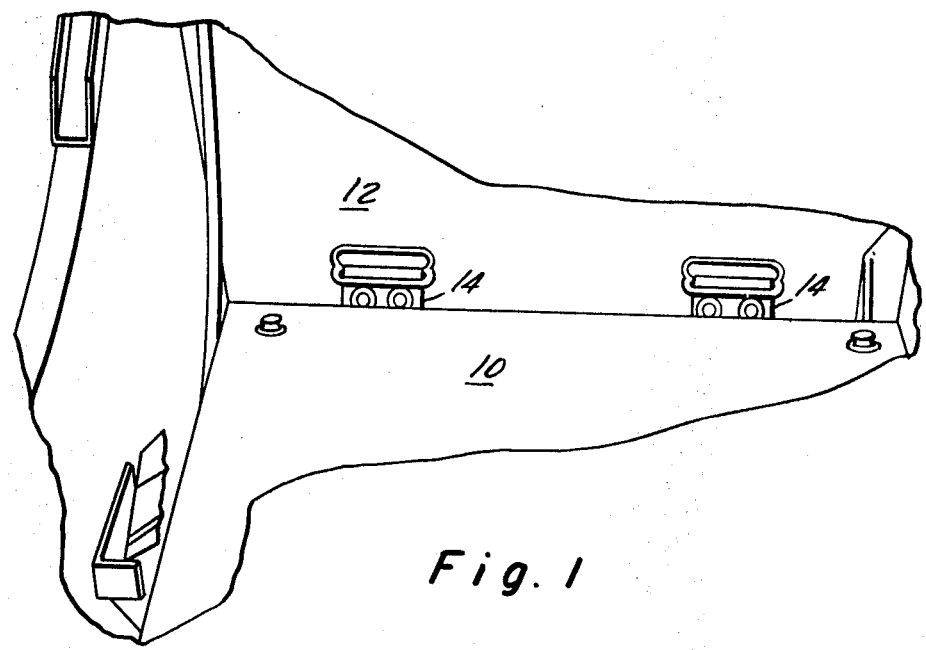
FIG. 1 is a perspective view of a portion of an aircraft interior showing one portion of a quick-disconnect device designed in accordance with a preferred embodiment of the present invention.
Figure 2:
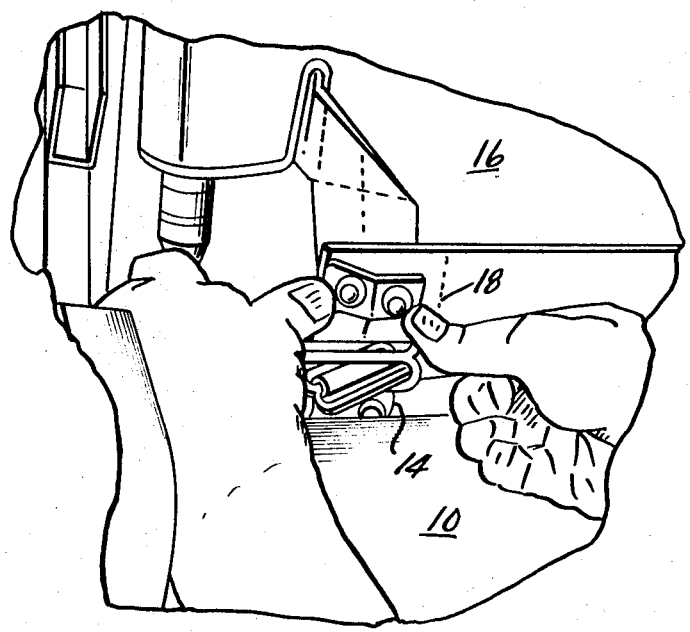
FIG. 2 is a view along the lines of FIG. 1, showing one step in the connection of the two portions of the invention device when the latter is employed in an aircraft.

Referring now to FIG. 1 of the drawings, a portion of the interior of a military aircraft is shown, with a survival kit being indicated by the reference numeral 10. This kit is customarily positioned to lie horizontally ahead of the pilot's back rest 12, and has a pair of straps 14 attached to one edge thereof and rising for a short distance above the kit's upper surface. These straps 14 each have a portion of the invention fastening device attached to the free end thereof, and are designed for attachment to a parachute assembly 16 as best illustrated in FIG. 2, such assembly resting against the rear surface of the pilot seat 12.

The details of parachute assembly 16 form no part of the present invention, and it is only necessary to recognize that such assembly includes a pair of downwardly-projecting straps 18 (only one of which is visible in FIG. 2) intended to be respectively connected to the straps 14 associated with the survival kit 10. Although FIG. 2 illustrates one step in the strap-connecting process, the complete procedure will be more clearly understood by reference to FIGS. 3 through 7 of the drawings and to the description which follows.

Each of the straps 14 and 18 has a portion of the invention fastening device attached thereto. For example, FIG. 3 illustrates the manner in which strap 14 carries on the end thereof a plate 20 having formed therein a pair of slots 22 lying parallel to one another and transversely across the full width of the strap. The end of the strap (which may, for example, consist of a two-ply webbing of nylon or other stress-resistant flexible material) is looped through one of the slots 22, around the center bar 24, and then back through the other slot 22 to lie face-to-face with the rear surface of the strap. It is then secured thereto by means such as the respective base portions 26 of two snap fasteners which have a further function to be later set forth. FIG. 7 illustrates in cross-section this arrangement in greater detail. The assembled fastener portion then appears as in FIG. 3 of the drawings.

The remaining fastener portion is carried on the end of the other strap 18. It consists of a further plate 28 likewise having formed therein two parallel slots 30 extending parallel to one another and transverse to the direction of the strap. However, the *length* of each of these slots 30 is expressly selected to be *less* than the outside dimension of the plate 20 as measured between the points A and B in FIG. 3. Consequently, the plate 20 is *not* receivable in, or removable from, either slot 30 when the two plates 20 and 28 lie in *parallel* relationship to one another (as in FIG. 5).

The plate 28 is fastened to the strap by looping the ends of the strap through one of the openings 30 and then sewing the strap portions together as indicated at 32.

In order to engage the two portions of the invention fastener, it is necessary to establish an angular relationship between the parts, as illustrated in FIG. 4. When the strap 14 is manipulated so that the plate 20 lies in a position such as shown in both FIGS. 2 and 4, one end of this plate may be inserted into one of the slots 30. The flexibility of the strap 14 allows the plate to be moved to the right (in FIG. 4) so that the remaining end may also be pushed through the slot 30. As soon as a parallel relationship is then established, the two plates lie in their final interlocking position as illustrated in FIG. 6. Since the ends of plate 20 are wider than the opening 30, the two plates can not become disengaged as long as this parallel relationship continues, no matter how great an operational stress may be applied to the fastening device.

Obviously this parallel plate relationship should be maintained as long as it is desired to continue the association of parachute 16 and survival kit 10. To ensure that the two fastener portions may not become separated inadvertently, a safety flap 34 is sewn or otherwise attached to strap 18 in the manner shown by the reference numeral 35 this flap 34 carries the cap portions 36 of the two base snaps 26 attached to the strap 14. Ordinarily, the flap 34 lies as shown in FIGS. 3 through 5 when the two fastener portions are disengaged from one another. However, after the relationship of FIG. 5 has been established, the flap 34 is lowered as shown in FIGS. 6 and 7, and the cap portions 36 of the snaps engaged with their respective base portions 26. The flap 34 now covers the plates 20 and 28, tightly retaining them in position and precluding any inadvertent separation.

The disengagement process is the reverse of that described above. After the flap 34 has been raised, the plate 20 is shifted to one side so that one end of the plate can be drawn through the opening 30, as again shown by FIG. 4. The remainder of the plate is then readily removable.

It is emphasized that the invention fastener is capable of utilization wherever two members are to be joined by at least one flexible strap. The particular environment described above is purely exemplary, and has been chosen solely to illustrate one particularly advantageous application of the invention concept.

Obviously many modifications and variations of the present invention are possible in the light of the above teachings. It is therefore to be understood that within the scope of the appended claims the invention may be practiced otherwise than as specifically described.

We claim:

1. A quick-connect fastening device adapted to joint two flexible straps without introducing an appreciable variation in overall strap length, said device comprising:
   a first fastener portion attached to an end of one of said straps;
   said first fastener portion comprising a plate having at least one slot therein extending transversely of said strap,
   a second fastener portion attached to an end of the other of said straps;
   said second fastener portion comprising a further plate having an overall width greater than the length of the transverse slot in the plate comprising said first fastener portion;
   said second fastener portion thus being receivable in, or removable from, the slot in said first fastener portion only when said second fastener portion lies at an angle to the position assumed thereby when said two fastener positions are connected,
   further comprising a safety flap carried by one of said flexible straps separably fastenable to the other flexible strap, and designed to closely overlie said two fastener portions following a connection thereof, thereby precluding said two fastener portions from assuming an angular relationship with one another until such time as a disconnection of said fastening device is desired.

2. The combination of claim 1 in which said safety flap carries the cap portion of at least one snap fastener, the base portion of such snap fastener being carried by the other of said flexible straps.

References Cited

UNITED STATES PATENTS

| 446,186 | 2/1891 | Leck | 2—322 |
| 661,689 | 11/1900 | Clow | 2—322 |
| 3,103,050 | 9/1963 | Rejtmeier | 24—203 |
| 3,160,158 | 12/1964 | Rayhart | 24—203 X |

FOREIGN PATENTS

| 906,561 | 3/1954 | Germany | 24—201 A |
| 141,894 | 4/1920 | Great Britain | 24—77 |
| 878,350 | 9/1961 | Great Britain | 244—151 |
| 96,791 | 5/1897 | Germany | 24—203 |

BERNARD A. GELAK, Primary Examiner

U.S. Cl. X.R.

24—203